UNITED STATES PATENT OFFICE 2,416,100

DERIVATIVES OF THIOPHAN-3-ONE-4-CARBOXYLIC-ACID-ESTERS AND PROCESS FOR THE MANUFACTURE OF SAME

Paul Karrer, Zurich, Switzerland, assignor to Hoffmann-La Roche Inc., Nutley, N. J., a corporation of New Jersey No Drawing. Application December 21, 1943, Serial No. 515,170. In Switzerland February 17, 1943

12 Claims. (Cl. 260—329)

Thiophan-3-one-4-carboxylic-acid-esters, carrying in position 2 an aliphatic substituent (X) and corresponding to Formula I

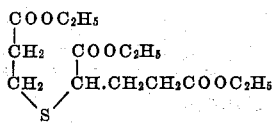

wherein R represents a lower alkyl radical and X an aliphatic substituent, are valuable starting materials for the manufacture of therapeutically employable preparations capable of exerting the pharmacological activity of biotin. The substituent X in position 2 may, for instance, consist of the following radicals:

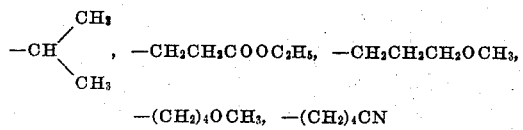

It has been found that compounds of the said constitution may be obtained by treating sulfide-$\beta$-propionic-acid-(X-acetic-acid)-esters of Formula II

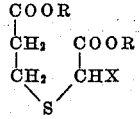

wherein R represents a lower alkyl group and X an aliphatic radical, with condensing agents, such as lower alkali alcoholate, alkali amide, and similar means. Hereby the formation of a ring takes place and compounds corresponding to Formula I are obtained.

The new compounds are to be used for the manufacture of therapeutics.

Example 1

6.6 parts by weight of $\beta$-mercapto-propionic-acid-ethyl-ester are added drop by drop to a solution of 1.0 part by weight of sodium in 20 parts by volume of ethyl alcohol at 0° C. in an atmosphere of nitrogen. In the same manner 12 parts by weight of $\alpha$-bromo-glutaric-acid-ester, dissolved in little alcohol, are added while cooling strongly. The reaction materials are left to stand for two hours in the freezing mixture, whereupon they are heated to 15° C. for half an hour, and, finally, to boiling for 30 minutes. The alcohol is driven off in vacuo, the residue is taken up in little water and extracted with ether. After evaporation of the solvent, sulfide-$\beta$-propionic-acid-($\alpha$-glutaric-acid)-ester of Formula III

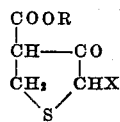

is obtained as a colorless liquid, distilling over at 150–153° C. under a pressure of 0.02 mm. Hg.

In order to transform this compound into the thiophanone derivative of Formula IV

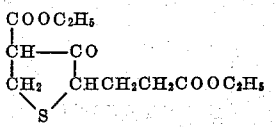

1.9 parts by weight of the former are added drop by drop to a suspension of 0.8 part by weight of amorphous sodium ethylate in 50 parts by volume of toluene while stirring. The reaction mixture is heated to 110° C. for 9 hours while stirring is continued. The reaction product is then poured on ice, to which 1.5 parts by volume of glacial acetic acid were added, extracted with peroxide-free ether, and the ether is driven off. The oil remaining behind distills over at 123° C. under a pressure of 0.02 mm. Hg as a colorless liquid. The compound which shows an intensive red-violet coloring with iron chloride is the 2-(carbethoxy-ethyl)-thiophan-3-one-4-carboxylic-acid-ethyl-ester of Formula IV.

Example 2

7.5 parts by weight of $\beta$-mercapto-propionic-acid-ethyl-ester, dissolved in 5 parts by volume of alcohol, are added drop by drop to an ice-cold solution of 1.08 parts by weight of sodium in 18 parts by volume of absolute alcohol. Under an atmosphere of nitrogen, 11.8 parts by weight of $\alpha$-bromo-omega-methoxy-capronic-acid-ethyl-ester, dissolved in 10 parts by volume of absolute alcohol, are added at —20° C. The mixture is left to stand for 4–5 hours in the freezing mixture while shaking vigorously, then heated to 15° C. for one hour and, finally, for a short time on a boiling water bath. The alcohol is driven off in vacuo, the residue taken up in little water, shaken out with peroxide-free ether, whereupon the solvent is evaporated and the residue is fractionated in high vacuo. Sulfide-$\beta$-propionic-acid-$\alpha$-(omegamethoxy-capronic-acid)-ethyl-ester of Formula V

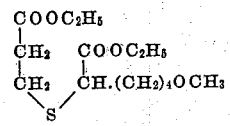

distills over under a pressure of 0.025 mm. Hg at 142° C. as a colorless oil.

The cyclisation of the compound to the corresponding thiophanone derivative is effected by the aid of amorphous sodium-ethylate dissolved in toluene in a manner analogous to the one described in Example 1. The 2-(omega-methoxy-butyl)-thiophan-3-one-4-carboxylic-acid-ethyl-ester of Formula VI

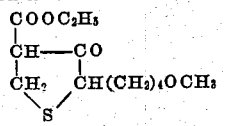

thus obtained distills over at 110–115° C. under a pressure of 0.025 mm. Hg as a colorless oil showing an intensive red-violet coloring with iron chloride.

I claim:
1. 2-(carbethoxy-ethyl)-thiophan-3-one-4-carboxylic-acid-ethyl-ester having the formula:

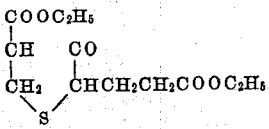

2. 2-(omega-methoxy-butyl)-thiophan-3-one-4-carboxylic-acid-ethyl-ester having the formula:

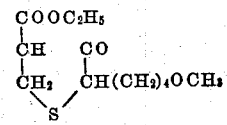

3. Process for the manufacture of 2-(carbethoxy-ethyl)-thiophan-3-one-4-carboxylic-acid-ethyl-ester, comprising treating sulfide-β-propionic-acid-(α-glutaric-acid)-ester of the formula

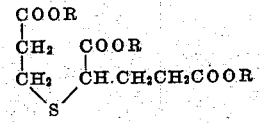

wherein R represents a saturated lower alkyl radical, with an alkaline condensing agent capable of promoting ring closure.

4. Process for the manufacture of 2-(carbethoxy-ethyl)-thiophan-3-one-4-carboxylic-acid-ethyl-ester, comprising treating sulfide-β-propionic-acid-(α-glutaric-acid)-ethyl-ester of the formula

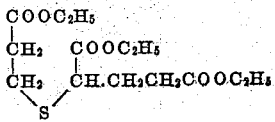

with sodium ethylate.

5. Process for the manufacture of 2-(omega-methoxy-butyl)-thiophan-3-one-4-carboxylic-acid-ethyl-ester, comprising treating sulfide-β-propionic-acid-α-(omega-methoxy-capronic-acid)-ester of the formula

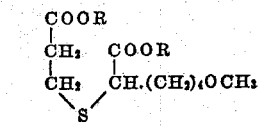

wherein R represents a saturated lower alkyl radical, with an alkaline condensing agent capable of promoting ring closure.

6. Process for the manufacture of 2-(omega-methoxy-butyl)-thiophan-3-one-4-carboxylic-acid-ethyl-ester, comprising treating sulfide-β-propionic-acid-α-(omega-methoxy-capronic-acid)-ethyl-ester of the formula

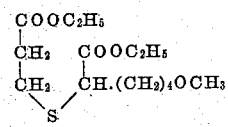

with sodium ethylate.

7. Thiophan-3-one-4-carboxylic-acid-esters of the formula:

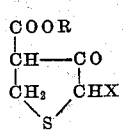

wherein R represents a lower alkyl radical and X is a substituted alkyl group selected from the group consisting of

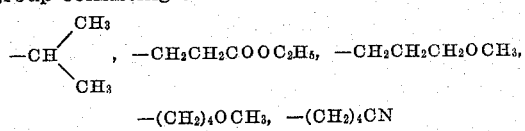

8. The compounds of claim 5 in which X represents as follows:

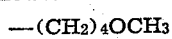

9. Process for the manufacture of thiophan-3-one-4-carboxylic-acid-ester, comprising treating a sulfide-β-propionic-acid-(X-acetic-acid)-ester of the formula:

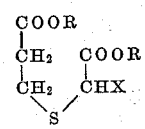

wherein R represents a lower alkyl radical and X is a substituted alkyl selected from the group consisting of

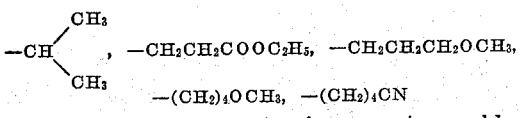

with an alkaline condensing agent capable of promoting ring closure.

10. The method of claim 6 in which the condensing agent is a lower alkali alcoholate.

11. The method of claim 6 in which the condensing agent is sodium ethylate.

12. The method of claim 6 in which the condensing agent is an alkali amide.

PAUL KARRER.

REFERENCES CITED

The following references are of record in the file of this patent:

FOREIGN PATENTS

| Number | Country | Date |
|---|---|---|
| 282,914 | German | Mar. 22, 1915 |

OTHER REFERENCES

Journal of Biochemistry, vol. 146 (1942), page 475.